US007899613B2

(12) United States Patent
Artini

(10) Patent No.: US 7,899,613 B2
(45) Date of Patent: Mar. 1, 2011

(54) METHOD AND DEVICE FOR ENSURING THE SAFETY OF LOW-ALTITUDE FLIGHT OF AN AIRCRAFT

(75) Inventor: Franck Artini, Toulouse (FR)

(73) Assignee: Airbus France, Toulouse (FR)

(*) Notice: Subject to any disclaimer, the term of this patent is extended or adjusted under 35 U.S.C. 154(b) by 1217 days.

(21) Appl. No.: 11/121,058

(22) Filed: May 4, 2005

(65) Prior Publication Data

US 2005/0273248 A1 Dec. 8, 2005

(30) Foreign Application Priority Data

May 18, 2004 (FR) .................................. 04 05379

(51) Int. Cl.
| | |
|---|---|
| *G06F 19/00* | (2006.01) |
| *G06G 7/70* | (2006.01) |
| *G06G 7/76* | (2006.01) |
| *G05D 1/00* | (2006.01) |
| *G05D 3/00* | (2006.01) |
| *G06F 7/00* | (2006.01) |
| *G06F 17/00* | (2006.01) |
| *G05D 1/08* | (2006.01) |
| *G05D 1/06* | (2006.01) |
| *G01C 5/00* | (2006.01) |
| *G01C 23/00* | (2006.01) |
| *G01C 21/00* | (2006.01) |
| *G08B 23/00* | (2006.01) |

(52) U.S. Cl. .................... 701/120; 340/963; 340/971; 340/976; 340/979; 701/4; 701/5; 701/8; 701/9

(58) Field of Classification Search .................. None
See application file for complete search history.

(56) References Cited

U.S. PATENT DOCUMENTS

| | | | | |
|---|---|---|---|---|
| 3,882,406 | A | * 5/1975 | Graves et al. | ................. 327/71 |
| 4,363,933 | A | * 12/1982 | Mercer | ...................... 178/118 |
| 4,467,429 | A | * 8/1984 | Kendig | .......................... 701/3 |
| 4,692,765 | A | * 9/1987 | Politis et al. | ................ 342/106 |
| 4,872,120 | A | * 10/1989 | Orloff et al. | ................. 702/52 |
| 4,924,401 | A | * 5/1990 | Bice et al. | ..................... 701/6 |
| 5,442,556 | A | 8/1995 | Boyes et al. | |
| 5,706,011 | A | * 1/1998 | Huss et al. | .................... 342/65 |
| 5,850,617 | A | * 12/1998 | Libby | ......................... 701/202 |
| 5,892,462 | A | * 4/1999 | Tran | .......................... 340/961 |
| 5,922,031 | A | * 7/1999 | Larrieu | ......................... 701/3 |

(Continued)

OTHER PUBLICATIONS

Preliminary Search Report dated Dec. 29, 2004.

*Primary Examiner*—Khoi Tran
*Assistant Examiner*—Nicholas Kiswanto
(74) *Attorney, Agent, or Firm*—Dickinson Wright PLLC

(57) ABSTRACT

Method and device for ensuring the safety of a low-altitude flight of an aircraft.

The device (1) comprises a recording means (8) corresponding to an operation critical instrument for recording, during a low-altitude flight, one part at least of the lateral trajectory of the flight trajectory situated ahead of the current position of the aircraft, a monitoring means (11) for monitoring, during a low-altitude flight, the availability at least of said lateral trajectory, and a guidance system (3) for taking the aircraft up to a safe altitude, taking into account said part of the trajectory recorded by said recording means (8), when said monitoring means (11) has detected a loss of said lateral trajectory.

21 Claims, 2 Drawing Sheets

U.S. PATENT DOCUMENTS

| | | | |
|---|---|---|---|
| 6,163,744 A * | 12/2000 | Onken et al. | 701/3 |
| 6,173,219 B1 * | 1/2001 | Deker | 701/3 |
| 6,269,301 B1 * | 7/2001 | Deker | 701/206 |
| 6,437,707 B1 * | 8/2002 | Johnson | 340/959 |
| 6,480,120 B1 * | 11/2002 | Meunier | 340/970 |
| 6,502,015 B1 | 12/2002 | Brookes et al. | |
| 6,675,095 B1 * | 1/2004 | Bird et al. | 701/301 |
| 6,748,325 B1 * | 6/2004 | Fujisaki | 701/301 |
| 2002/0109612 A1 * | 8/2002 | Simon et al. | 340/945 |

* cited by examiner

METHOD AND DEVICE FOR ENSURING THE SAFETY OF LOW-ALTITUDE FLIGHT OF AN AIRCRAFT

The present invention relates to a method and a device for ensuring the safety of low-altitude flight of an aircraft being guided along a low-altitude flight trajectory comprising a lateral trajectory and a vertical trajectory.

The present invention applies more particularly, although not exclusively, to a military transport plane that exhibits a low thrust/weight ratio and a high inertia, and whose times for maneuver are generally relatively slow.

As regards the present invention, low-altitude flight is taken to mean flight along a flight trajectory (at low altitude) that allows an aircraft to follow the terrain being over-flown as closely as possible, in particular to avoid being detected. Such a low-altitude flight trajectory is therefore situated at a predetermined height above the terrain, for example 500 feet (around 150 meters).

By reason of this proximity to the ground, any lateral or downward vertical deviation (beyond a certain safety margin) of the aircraft, with respect to the flight trajectory to be followed, as the aircraft is guided along said trajectory, presents a high risk of collision with the terrain being over-flown or with a structure or element situated on said terrain (during a flight with no visibility).

In particular, when a fault in one of the aircraft systems leads to a loss of the lateral trajectory (notably when the computer that supplies the lateral trajectory, or the link between this computer and the guidance system, develops a fault, or else when the lateral trajectory entered into the guidance system is incorrect), the crew (or an automatic guidance system) no longer has any lateral reference available for flying the aircraft. In this case, the crew must immediately implement a manual safety maneuver to fly the aircraft safely up to a safe altitude at which it is no longer at risk of colliding with the terrain. However, with no lateral reference, even such a safety maneuver presents a high risk of collision with the terrain or with a structure or an element situated on the said terrain. Such a risk is naturally unacceptable during a flight with no visibility.

A subject of the present invention is a method for ensuring the safety of low-altitude flight of an aircraft being guided along a low-altitude flight trajectory comprising a lateral trajectory and a vertical trajectory, that allows the aforementioned drawbacks to be overcome.

For this purpose, according to the invention, said method is noteworthy in that:
during said low-altitude flight, the following operations are carried out continuously:
one part at least of the lateral trajectory of the flight trajectory situated ahead of the current position of the aircraft is recorded; and
the availability at least of said lateral trajectory is monitored; and
during this monitoring operation, when a loss of said lateral trajectory is detected, the aircraft is guided in order to take it up to a safe altitude, taking into account said part of the trajectory recorded during this guidance.

Thus, thanks to the recording of one part (at least) of the lateral trajectory, in the case of loss of said lateral trajectory, lateral references are always available that allow the aircraft to be guided and to be taken in total safety up to said safe altitude, at which it is no longer at risk of colliding with the terrain.

As will be seen below, the recording is made by equipment (recording means, recording medium) that is operation critical, in other words that is robust and reliable, and that is for example mounted within an automatic pilot having, by its very nature, a very high level of criticality and, in particular, higher than that of a flight trajectory computer supplying the low-altitude flight trajectory.

Preferably, during said low-altitude flight, one part of the whole flight trajectory, comprising said lateral trajectory and also said vertical trajectory, is recorded.

As regards the present invention, said safe altitude can be a predetermined value (published value). It may also be computed on board the aircraft, for example by means of a digital data base of the terrain.

Preferably, the aircraft is guided in a climb at maximum slope in order to take it up to said safe altitude.

In a first embodiment, the aircraft is guided manually by a pilot in order to be taken up to said safe altitude, using stored lateral information that is presented to him (for example, in the form of a drawing of the stored lateral flight plan or of a lateral flight director).

In a second embodiment, the aircraft is guided automatically in order to be taken up to said safe altitude. It should be noted that, in the aforementioned usual situations, such an embodiment (relating to an automatic pilot) is not possible since no lateral reference is available after the loss of the lateral trajectory. On the other hand, thanks to the invention, the aircraft can always be guided automatically, whatever the situation, and especially during a safety maneuver.

Furthermore, advantageously:
an alarm signal is emitted when a loss of lateral trajectory is detected; and/or
a characteristic indication is generated when the aircraft is guided in order to be taken up to said safe altitude.

Another subject of the present invention is a device for ensuring the safety of low-altitude flight of an aircraft being guided along a low-altitude flight trajectory comprising a lateral trajectory and a vertical trajectory.

According to the invention, said safety device is noteworthy in that it comprises:
a recording means for recording, during a low-altitude flight, one part at least of the lateral trajectory of the flight trajectory situated ahead of the current position of the aircraft;
a monitoring means for monitoring, during a low-altitude flight, the availability at least of said lateral trajectory; and
a guidance system for taking the aircraft up to a safe altitude, taking into account said part of the trajectory recorded by said recording means, when said monitoring means has detected a loss of said lateral trajectory.

Said safety device according to the invention is easy to implement, effective and compact.

According to the invention, said recording means is integrated into said guidance system, for example in an automatic pilot or in a flight control system of said guidance system which, being by design very robust and very reliable, thus avoids any risk of the recorded part of the flight trajectory being lost.

Advantageously, said guidance system comprises:
manual guidance means; and/or
automatic guidance means, comprising for example an automatic pilot.

Furthermore, in a particular embodiment, said safety device additionally comprises:
a means for emitting an alarm signal when a loss of lateral trajectory is detected by said monitoring means; and/or a means for generating a characteristic indication when the aircraft is guided by said guidance system in order to be taken up to said safe altitude.

The attached drawings will facilitate understanding of the implementation of the invention.

Figure 1:
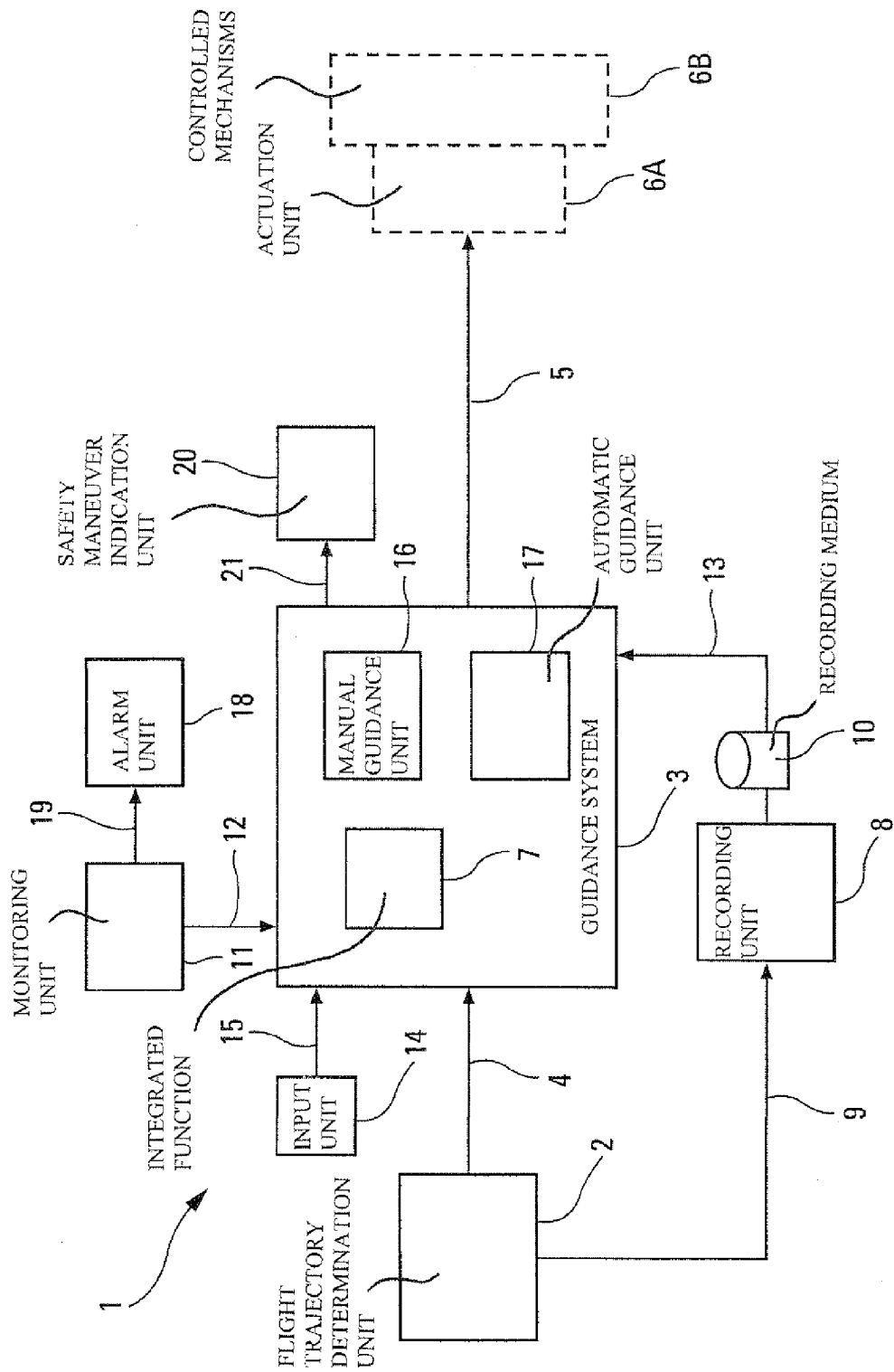
FIG. 1 is the schematic diagram of a device according to the invention.

The device 1 according to the invention and shown schematically in the figure is designed to ensure the safety of a low-altitude flight of an aircraft, for example of a transport plane, of a fighter plane or of a helicopter.

For this purpose, said device 1, which is on board the aircraft, is of the type comprising:

usual means 2 for determining a flight trajectory TO comprising a lateral trajectory TL defined in a horizontal plane and a vertical trajectory TV (or flight profile) defined in a vertical plane. In order to be able to fly at low altitude, the flight trajectory TO (at low altitude) must allow the aircraft to follow the terrain over-flown as closely as possible; and a guidance system 3, that is connected by means of a link 4 to the means 2, for guiding the aircraft along said flight trajectory TO. The said guidance system 3 determines flight commands for the aircraft which are such that the latter follows said flight trajectory TO. These flight commands are transmitted by a link 5 to means 6A for actuating controlled mechanisms 6B, such as for example aircraft rudders (vertical, horizontal, . . . ), said actuation means 6A and said control mechanisms 6B being shown with dashed lines in the figure.

In order to allow the aircraft, during a low-altitude flight, to return to a safe altitude in the case of loss at least of the lateral trajectory TL (such that the guidance system 3 then no longer has any lateral reference available for guiding said aircraft, at low altitude, along valleys for example), said device 1 additionally comprises:

a usual recording means 8, which is connected via a link 9 to the means 2, for recording, onto a usual recording medium 10, during the low-altitude flight along said flight trajectory TO at low altitude, one part at least of the lateral trajectory TL of said flight trajectory TO, which part is situated immediately ahead of the current position of the aircraft. The current position of the aircraft is known from usual means not shown;

a monitoring means 11 for monitoring, during the low-altitude flight along said flight trajectory TO, the availability at least of said lateral trajectory TL of the flight trajectory TO; and a guidance system that corresponds to the guidance system 3 in the preferred (but non-limiting) example shown in the figure. This guidance system 3 is designed to take the aircraft up to a safe altitude when said monitoring means 11 detects a loss of the lateral trajectory TL and when it informs said guidance system 3 of this loss via a link 12.

According to the invention, said guidance system 3 then takes the aircraft up to said safe altitude by implementing a safety maneuver (namely, a climbing maneuver), taking into account (for example within an integrated function 7) said part of the trajectory recorded by said recording means 8 onto the recording medium 10 and received via the link 13.

Thus, thanks to the knowledge of the part of the (lateral) trajectory ahead of the current position of the aircraft, the latter can be guided in total safety (at least in laterally), during said safety maneuver, in order to climb to a safe altitude, at which it can fly in total safety.

As regards the present invention, the safe altitude (which may be an altitude or a height above the ground) corresponds to an altitude at which there exists no risk of collision of the aircraft with the terrain, where said altitude can notably depend on the guidance and flight capabilities of the aircraft and on the configuration of the relief.

In a particular embodiment, said safe altitude is supplied to the guidance system 3 by a particular means 14 that is connected via a link 15 to said guidance system 3. This particular means 14 can be a usual input means (keyboard, mouse, rotary knob, . . . ) available to a crew member. Thus, the crew can adapt the safe altitude to the real conditions encountered (notably external conditions and current state of the aircraft). The said particular means 14 may also comprise a data base containing the safe altitude, or a calculation means for automatically computing said safe altitude in real time, in particular as a function of the position of the aircraft.

For the implementation of the present invention, the recording means 8 only needs to record one section of the lateral trajectory TL of the flight trajectory TO, immediately ahead of the current position of the aircraft. However, in a particular embodiment, said recording means 8 records a section of the whole flight trajectory TO ahead of the current position of the aircraft, in other words of both the lateral trajectory TL and of the vertical trajectory TV. The recorded flight trajectory TO is therefore a three-dimensional trajectory. This allows additional information to be obtained and thus to enhance the safety of the climbing maneuver still further.

In a preferred embodiment, said guidance system 3 guides the aircraft in a climb with the maximum slope during the climbing maneuver. Thus, the aircraft is taken in total safety up to the safe altitude. It should be noted that the guidance system 3 generally guides an aircraft at low altitude without using the maximum available power so that, in such a situation, the climbing maneuver is preferably performed using the maximum available power.

In a particular embodiment, said guidance system 3 can comprise:

usual manual guidance means 16 allowing a pilot to perform the climbing maneuver manually (by actuating a usual control mechanism), depending on information received relating notably to the recorded part of the lateral trajectory TL, where this information can be presented to the pilot using usual means (screen, . . . ); and/or usual automatic guidance means 17, comprising for example an automatic pilot, that allow the guidance commands, to be transmitted to the means 6A, to be determined automatically using information relating to the recorded part of the lateral trajectory TL and received via the link 13.

In a particular embodiment:

said monitoring means 11 monitors the transmission of the lateral trajectory TL from said means 2 toward said guidance system 3 and it detects a loss of the lateral trajectory TL whenever any fault prevents this transmission. In practice, said monitoring means 11 can also detect the loss of more important information, such as the loss of the whole flight trajectory TO, given that, as regards the present invention, the condition for triggering the safety maneuver is the loss of the guidance lateral references; and/or said recording means 8 and said recording medium 10 are integrated into said guidance system 3, for example in an automatic pilot or in a flight control system of said guidance system 3 which, being by design very robust and very reliable, thus avoids any risk of the recorded part of the flight trajectory being lost. The same may be applied to the monitoring means 11.

Furthermore, the device 1 according to the invention additionally comprises:

- a usual means 18, that is connected by a link 19 to the monitoring means 11, for emitting an alarm signal, for example an audible signal and/or a visual signal, notably within the aircraft flight deck, when a loss of the lateral trajectory TL is detected by said monitoring means 11; and
- a usual means 20, that is for example connected by a link 21 to the guidance system 3, for generating a characteristic indication, for example on a usual integrated display means not shown, when the guidance system 3 implements a safety maneuver. This allows the crew members to be alerted, especially when the safety maneuver is implemented automatically without the intervention of a pilot.

The present invention may be implemented in various ways. By way of example:

- in a first variant, the recording means 8 records one part of the whole flight trajectory TO (lateral trajectory TL and vertical trajectory TV), therefore a three-dimensional trajectory, the means 18 emits an alarm signal for the pilot when a loss of the lateral trajectory TL is detected, and the pilot then carries out the safety maneuver manually;
- in a second variant, the recording means 8 records one part only of the lateral trajectory TL, a usual thrust control system that is integrated into the flight control system 3 automatically takes the power to the maximum power available and the pilot only has to actuate a corresponding actuation means in order to trigger the safety maneuver upon the loss of the lateral trajectory TL; and
- in a third variant, the recording means 8 is integrated into an automatic pilot or a flight control system (of the guidance system 3) which automatically computes the guidance commands allowing the implementation of a safety maneuver upon the loss of the lateral trajectory TL.

It should be noted that the safety device 1 according to the invention is easy to implement, effective and compact, and may be applied to any type of low-altitude flight trajectory TO.

Figure 2:
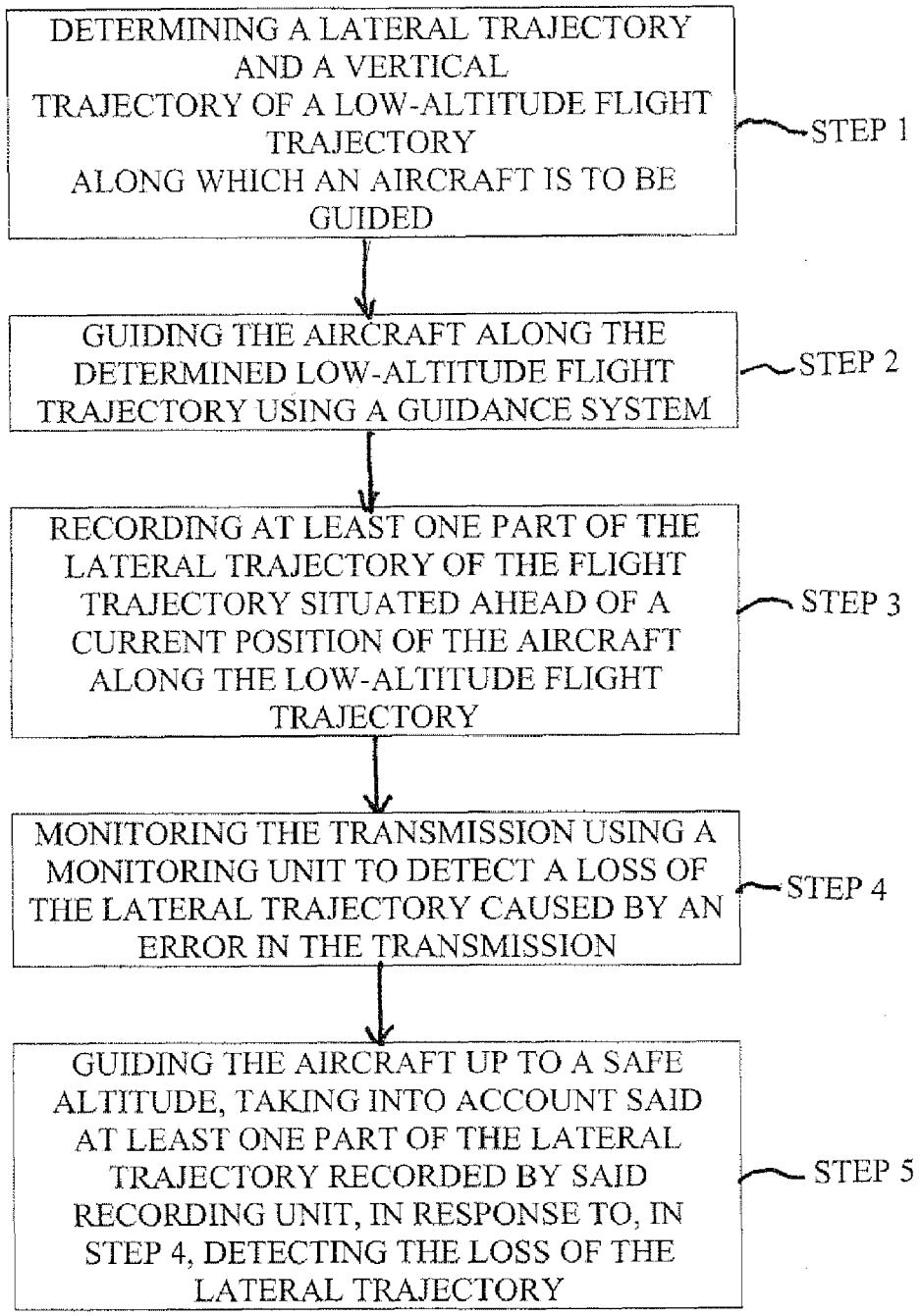
FIG. 2 is an illustration of the method steps so the invention.

As illustrated in FIG. 2, the present invention provides a method to ensure safety of low-altitude flight of an aircraft being guided along a low-altitude flight trajectory. This method includes, in Step 1, determining a lateral trajectory and a vertical trajectory of the low-altitude flight trajectory using a trajectory determining unit. In Step 2, the aircraft is guided along the determined low-altitude flight trajectory using a guidance system which is connected by a link to the trajectory determining unit and which receives a transmission of the low-altitude flight trajectory from the trajectory determining unit via the link. Step 3 includes recording at least one part of the lateral trajectory of the flight trajectory situated ahead of a current position of the aircraft along the low-altitude flight trajectory using a recording unit integrated into the guidance system. In Step 4, the transmission is monitored using a monitoring unit to detect a loss of the lateral trajectory caused by an error in the transmission, and in Step 5, the aircraft is guided up to a safe altitude, taking into account the at least one part of the lateral trajectory recorded by the recording unit, in response to, in step (d), detecting the loss of the lateral trajectory.

The invention claimed is:

1. A method to ensure safety of low-altitude flight of an aircraft being guided along a low-altitude flight trajectory, comprising:
   (a) determining a lateral trajectory and a vertical trajectory of the low-altitude flight trajectory using a trajectory determining unit;
   (b) guiding the aircraft along the determined low-altitude flight trajectory using a guidance system which is connected by a link to the trajectory determining unit and which receives a transmission of the low-altitude flight trajectory from the trajectory determining unit via the link;
   (c) recording at least one part of the lateral trajectory of the flight trajectory situated ahead of a current position of the aircraft along the low-altitude flight trajectory using a recording unit integrated into said guidance system;
   (d) monitoring the transmission using a monitoring unit to detect a loss of the lateral trajectory caused by an error in the transmission; and
   (e) guiding the aircraft up to a safe altitude, taking into account said at least one part of the lateral trajectory recorded by said recording unit, in response to, in step (d), detecting the loss of the lateral trajectory, wherein:
   the aircraft is guided automatically in order to be taken up to said safe altitude.

2. The method as claimed in claim 1, wherein, during said low-altitude flight, one part of the whole flight trajectory, comprising said lateral trajectory and also said vertical trajectory, is recorded.

3. The method as claimed in claim 1, wherein said safe altitude is a predetermined value.

4. The method as claimed in claim 1, wherein the aircraft is guided in a climb at maximum slope in order to take the aircraft up to said safe altitude.

5. The method as claimed in claim 1, wherein the aircraft is guided manually by a pilot in order to be taken up to said safe altitude.

6. The method as claimed in claim 1, wherein an alarm signal is emitted when the loss of the lateral trajectory is detected.

7. The method as claimed in claim 1, wherein a characteristic indication is generated when the aircraft is guided in order to be taken up to said safe altitude.

8. A device to ensure the safety of low-altitude flight of an aircraft being guided along a low-altitude flight trajectory, device comprising:
   a trajectory determining unit to determine the low-altitude flight trajectory comprising a lateral trajectory and a vertical trajectory;
   a guidance system, connected by a link to the trajectory determining unit, to guide the aircraft along the low-altitude flight trajectory determined by the trajectory determining unit, the guidance system receiving a transmission of the low-altitude flight trajectory from the trajectory determining unit via the link;
   a recording unit, integrated into said guidance system, to record, during a low-altitude flight, at least one part of the lateral trajectory of the flight trajectory determined by the trajectory determining unit and situated ahead of a current position of the aircraft along the low-altitude flight trajectory; and
   a monitoring unit to monitor, during a low-altitude flight, the transmission to detect a loss of the lateral trajectory caused by an error in the transmission;
   wherein, when said monitoring unit has detected the loss of the lateral trajectory, said guidance system guides the aircraft up to a safe altitude, taking into account said at least one part of the of the lateral trajectory recorded by said recording unit, wherein:

said guidance system comprises an automatic guidance unit.

9. The device as claimed in claim 8, wherein said guidance system comprises a manual guidance unit.

10. The device as claimed in claim 8, which additionally comprises an alarm unit to emit an alarm signal when the loss of lateral trajectory is detected by said monitoring unit.

11. The device as claimed in claim 8, which additionally comprises an indication unit to indicate a characteristic indication when the aircraft is guided by said guidance system in order to be taken up to said safe altitude.

12. An aircraft, which comprises the device of claim 8.

13. An aircraft, which comprises a device to implement the method of claim 1.

14. The device as claimed in claim 8, wherein the recording unit records only the at least one part of the lateral trajectory, and when the loss of the lateral trajectory is detected, a thrust control system integrated into the guidance system automatically adjusts a power of the aircraft to a maximum power and a pilot of the aircraft only has to actuate an actuating unit to enable the guidance system to guide the aircraft to the safe altitude.

15. A device to ensure the safety of low-altitude flight of an aircraft being guided along a low-altitude flight trajectory, device comprising;

a trajectory determining unit to determine the low-altitude flight trajectory comprising a lateral trajectory and a vertical trajectory;

a guidance system, connected by a link to the trajectory determining unit, to guide the aircraft along the low-altitude flight trajectory determined by the trajectory determining unit, the guidance system receiving a transmission of the low-altitude flight trajectory from the trajectory determining unit via the link;

a recording unit, integrated into said guidance system, to record, during a low-altitude flight, at least one part of the lateral trajectory of the flight trajectory determined by the trajectory determining unit and situated ahead of a current position of the aircraft along the low-altitude flight trajectory; and a monitoring unit to monitor, during a low-altitude flight, the transmission to detect a loss of the lateral trajectory caused by an error in the transmission, wherein:

when said monitoring unit has detected the loss of the lateral trajectory, said guidance system guides the aircraft up to a safe altitude, taking into account said at least one part of the of the lateral trajectory recorded by said recording unit, and the recording unit is integrated into an automatic pilot or a flight control system of the guidance system, and the automatic pilot or the flight control system automatically computes guidance commands to be used by said guidance system to automatically guide the aircraft up to a safe altitude.

16. The device as claimed in claim 15, wherein said guidance system comprises a manual guidance unit.

17. The device as claimed in claim 15, wherein said guidance system comprises an automatic guidance unit.

18. The device as claimed in claim 15, which additionally comprises an alarm unit to emit an alarm signal when the loss of lateral trajectory is detected by said monitoring unit.

19. The device as claimed in claim 15, which additionally comprises an indication unit to indicate a characteristic indication when the aircraft is guided by said guidance system in order to be taken up to said safe altitude.

20. An aircraft, which comprises the device of claim 15.

21. The device as claimed in claim 15, wherein the recording unit records only the at least one part of the lateral trajectory, and when the loss of the lateral trajectory is detected, a thrust control system integrated into the guidance system automatically adjusts a power of the aircraft to a maximum power and a pilot of the aircraft only has to actuate an actuating unit to enable the guidance system to guide the aircraft to the safe altitude.

* * * * *